United States Patent [19]
West et al.

[11] Patent Number: 5,342,239
[45] Date of Patent: Aug. 30, 1994

[54] OPERATION PARAMETERS FOR AN AXIAL SEPARATOR

[75] Inventors: Neil L. West; James W. Hall, both of Bettendorf, Iowa; Mark F. Stickler, Silvis; Richard L. Day, Port Byron, both of Ill.

[73] Assignee: Deere & Company, Moline, Ill.

[21] Appl. No.: 698,761

[22] Filed: May 10, 1991

[51] Int. Cl.⁵ .............................. A01F 7/06
[52] U.S. Cl. ........................ 460/69; 460/80; 460/110
[58] Field of Search ............ 460/69, 79, 80, 81, 460/83, 70, 71, 121, 122, 107, 109, 110

[56] References Cited

U.S. PATENT DOCUMENTS

| | | |
|---|---|---|
| 1,776,396 | 6/1929 | Schlayer. |
| 1,824,632 | 2/1929 | Schlayer. |
| 2,050,631 | 3/1931 | Schlayer. |
| 4,408,618 | 10/1983 | Witzel ........................ 460/69 |
| 4,574,815 | 3/1986 | West et al. ................. 460/69 |
| 4,611,605 | 9/1986 | Hall et al. .................. 460/69 |
| 4,611,606 | 9/1986 | Hall et al. .................. 460/69 |
| 4,653,515 | 3/1987 | Tophinke et al. .......... 460/69 |
| 4,679,386 | 9/1987 | Lundahl et al. ......... 460/123 X |
| 4,700,717 | 10/1987 | Roderfeld et al. ........ 460/69 |
| 4,733,672 | 3/1988 | Tophinke .................. 460/69 |
| 4,739,773 | 4/1988 | West et al. ................. 460/69 |
| 4,875,891 | 10/1989 | Turner et al. .............. 460/110 |
| 4,884,994 | 12/1989 | Hall et al. .................. 460/66 |
| 4,969,853 | 11/1990 | Coers ........................ 460/80 |

*Primary Examiner*—Terry Lee Melius

[57] ABSTRACT

An agricultural combine having a transverse threshing cylinder and concave and an axial separator. The axial separator is provided with two side-by-side axial separator units, each unit having a rotor and a casing for housing the rotor. The casings are non-concentric housing having a semi-circular top, a semi-circular bottom and straight side walls joining the top and bottom. The rotor is provided with fixed teeth that extend radially outward from the rotor. The rotor is located at the bottom of the casing so the teeth can engage and penetrate the crop material at the bottom of the casing. The rotor throws the crop material upwardly against the top of the casing which is provided with downwardly projecting spiral vanes for directing the crop rearwardly. The rotor is rotated so that the tip speed of the teeth is greater than or equal to 11.8 m/sec and less than or equal to 20.9 m/sec.

4 Claims, 11 Drawing Sheets

OPERATION PARAMETERS FOR AN AXIAL SEPARATOR

BACKGROUND OF THE INVENTION

1. Field of the Invention

The invention is directed to a combine having a transverse threshing cylinder and a pair of axial separator units.

2. Description of the Prior Art

In threshing a harvested crop, the grain is separated from straw and chaff and deposited into a holding tank. With conventional combines the harvested crop is directed to a transversely mounted threshing cylinder and concave, which threshes the crop, separating the grain from straw. The residue is then directed to a beater, further separating the grain from straw. The straw residue is then passed over oscillating apertured straw walkers which direct the straw out of the back of the combine while allowing additional grain to fall through the apertures. Grain and chaff falling from the threshing concave and straw walkers is directed to a cleaning shoe for separating the chaff from the grain. A blower assembly is used in this final step to blow the lighter chaff away from the heavier grain.

In an axial flow combine, the grain is directed to a cylindrical tube housing a rotor. The harvested crop is threshed and separated in the cylindrical tube with the grain and chaff falling therefrom in a manner similar to the conventional combine. Case International of Racine, Wis. currently markets and manufactures an axial flow combine having a single rotor. Ford New Holland of New Holland, Pa. currently markets and manufactures an axial flow combine having a pair of rotors mounted side-by-side.

Hybrid combines having a transverse threshing cylinder and a pair axial separating units are disclosed in U.S. Pat. Nos. 4,408,618, 4,574,815, 4,611,606, 4,611,605, 4,739,773, 4,875,891, 4,884,994, and 4,969,853. Such hybrid combines have unique advantages over conventional and axial machines. The transverse threshing cylinder and associated stone trap provides a superior proven stone removal system to that used on an axial combine. The threshing cylinder can be optimized separately from the separator unlike currently marketed axial machines. When compared to a conventional combine, the axial flow separators provide higher separation capacity than conventional straw walkers.

SUMMARY

The combine of the present invention is provided with a transverse threshing cylinder and concave and an axial separator. The speed and clearance of the cylinder and concave are adjusted in a conventional manner. The axial separator is provided with a pair of side-by-side axial separator units each having a rotor that is housed in a casing. The rotor has a plurality of fixed teeth which engage the crop mat in the casing. The casing itself is non-concentric with the rotor having a high clearance area into which the teeth do not extend and a teeth engagement area where the teeth engage the crop material. The teeth engage the crop material in the teeth engagement area and rotate the crop material around the bottom of the casing. The teeth then release the crop material upwardly into the high clearance area, where it contacts downwardly projecting spiral vanes which direct the crop material rearwardly.

It has been found that the tip speed of the teeth is critical in providing satisfactory crop material flow and separation. The rotor should be rotated to provide a minimum tooth tip speed of 11.8 m/sec and a maximum tip speed of 20.9 m/sec. If the rotor is rotated slower than required to reach a tooth tip speed of 11.8 m/sec the crop material will not cleanly release from the teeth. If the rotor is operated at a speed generating a tip speed greater than 20.9 m/sec straw breakage increases.

DETAILED DESCRIPTION

Combine Overview

Figure 1:
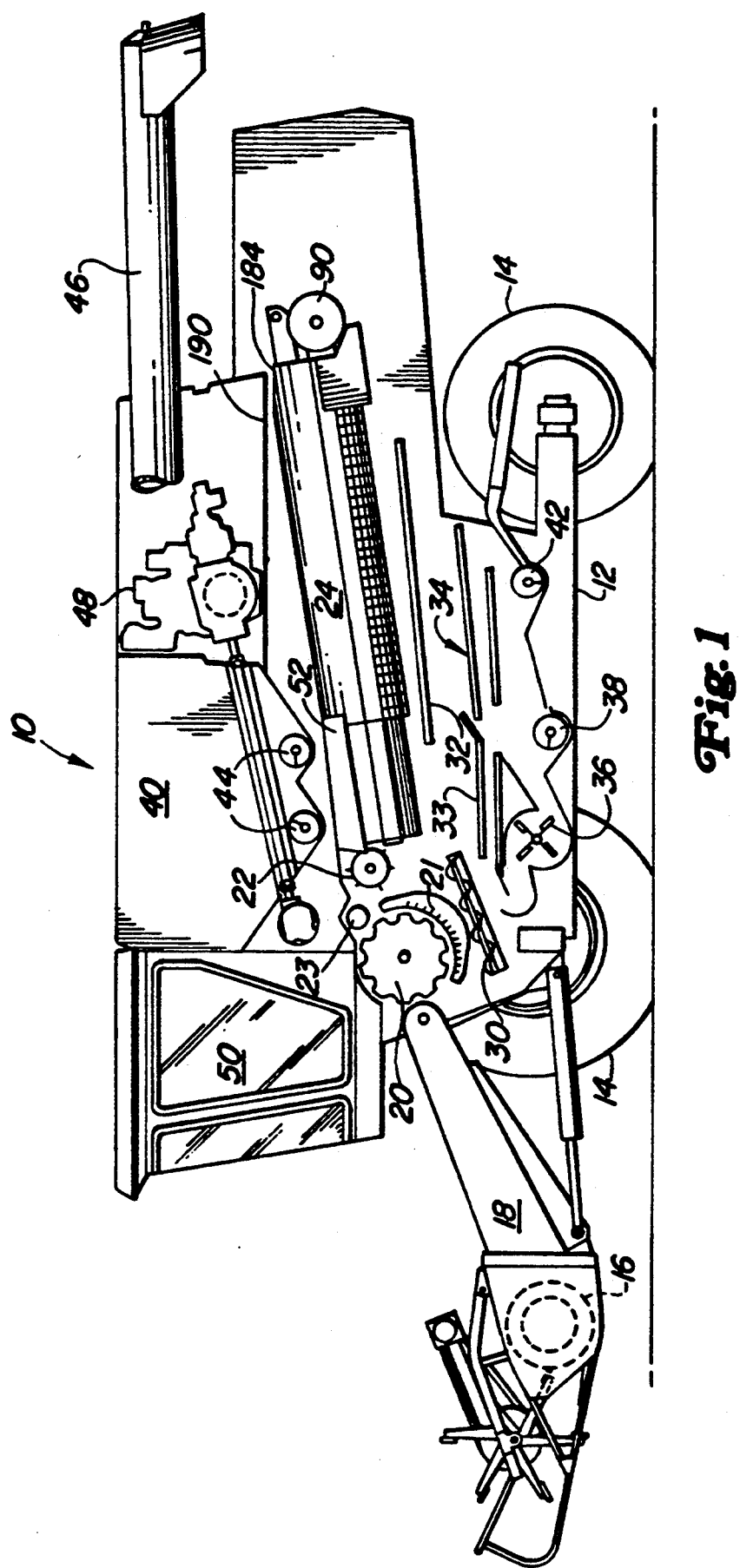
FIG. 1 is a semi-schematic side view of a combine having a transverse threshing cylinder and an axial separator.

FIG. 1 illustrates a self-propelled combine 10 having a supporting structure 12. The supporting structure is supported and propelled by ground engaging means comprising wheels 14. The ground engaging wheels are driven by a propulsion means (not shown), for propelling the combine across a field. The forward part of the combine is provided with a harvesting platform 16 for harvesting a crop in a field and directing the harvested crop upwardly through the feederhouse 18 to the threshing and separating means. The threshing and separating means comprises a transverse threshing cylinder 20 and associated concave 21 to which the harvested crop is initially directed, The threshed crop is then directed to a stripping roller 23 and beater 22 from which it enters axial separator 24.

Grain and chaff falling from the threshing means falls onto auger 30 which directs the grain and chaff to shaker pan 33. Grain and chaff falling from the axial separator falls onto shaker pan 32 which directs the grain and chaff falling thereon to shaker pan 33. Shaker pan 33 directs the grain and chaff to cleaning shoe 34. The cleaning shoe is provided with a blower assembly 36 to assist in separating the grain from the chaff. Clean grain is driven by the clean grain cross auger 38 to an elevator (not shown) which directs the grain to grain tank 40. Tailings cross auger 42 directs unthreshed heads back to the threshing means through another elevator (not shown). Clean grain is unloaded from grain tank 40 through an unloading system comprising cross augers 44 and unloading auger 46.

All the various systems are driven by internal combustion engine 48 which is controlled by the operator from operator's cab 50. The threshing means, separating means and cleaning means are housed within the sidewalls of the supporting structure.

Axial Separator Overview

Figure 2A:
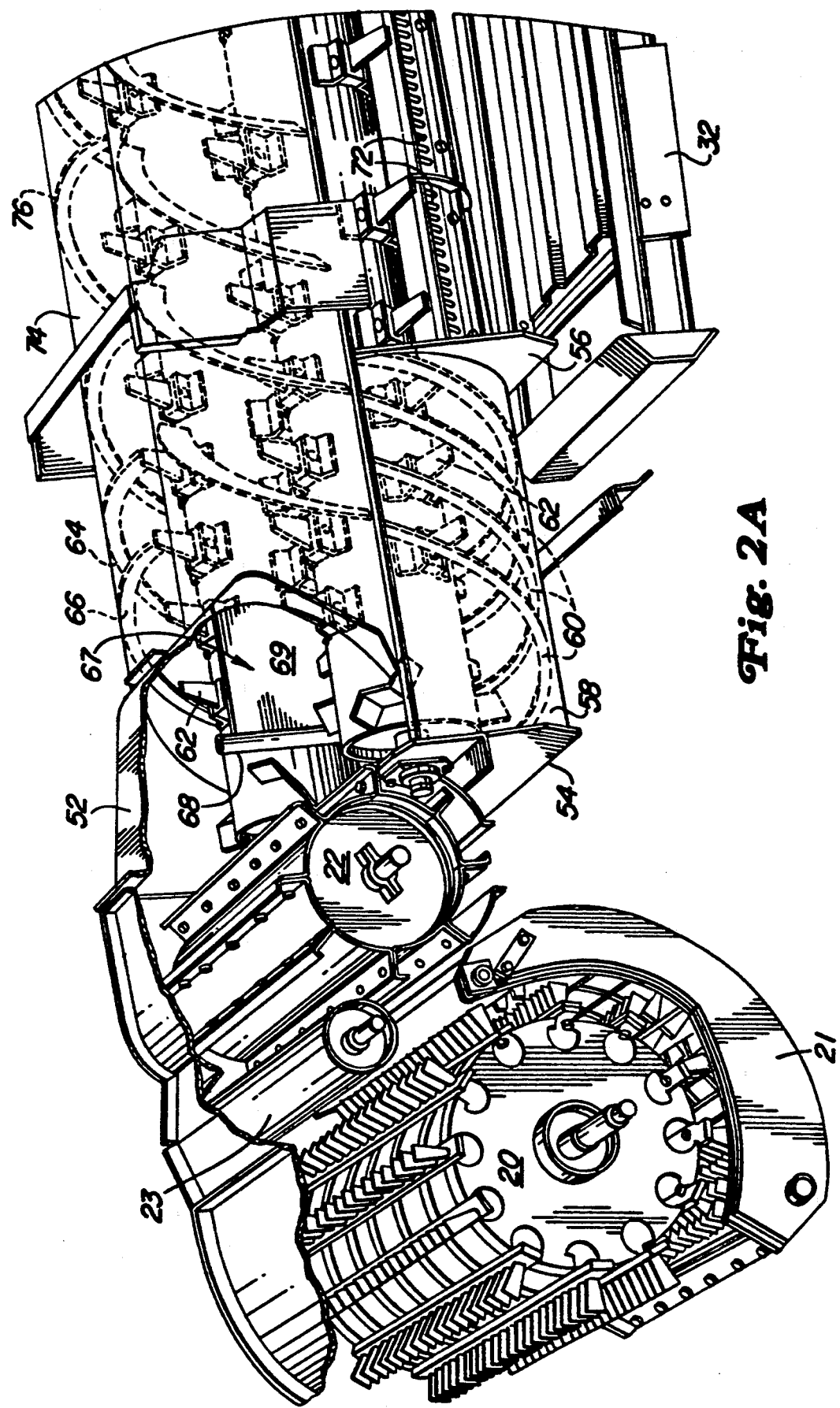
FIGS. 2a and 2b are partial cut away perspective views of threshing assembly and the axial separator.
Figure 2B:
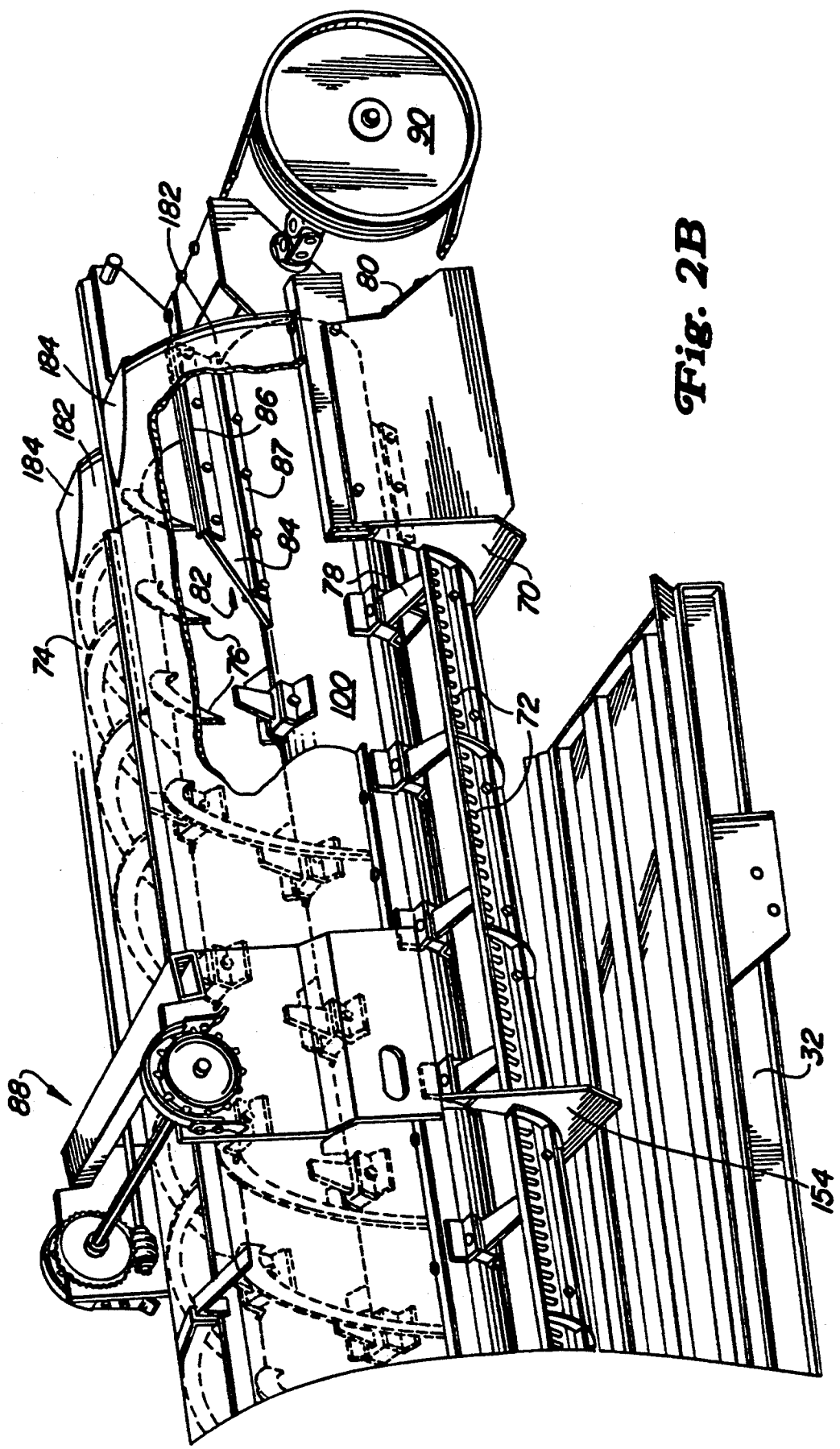
Figure 3A:
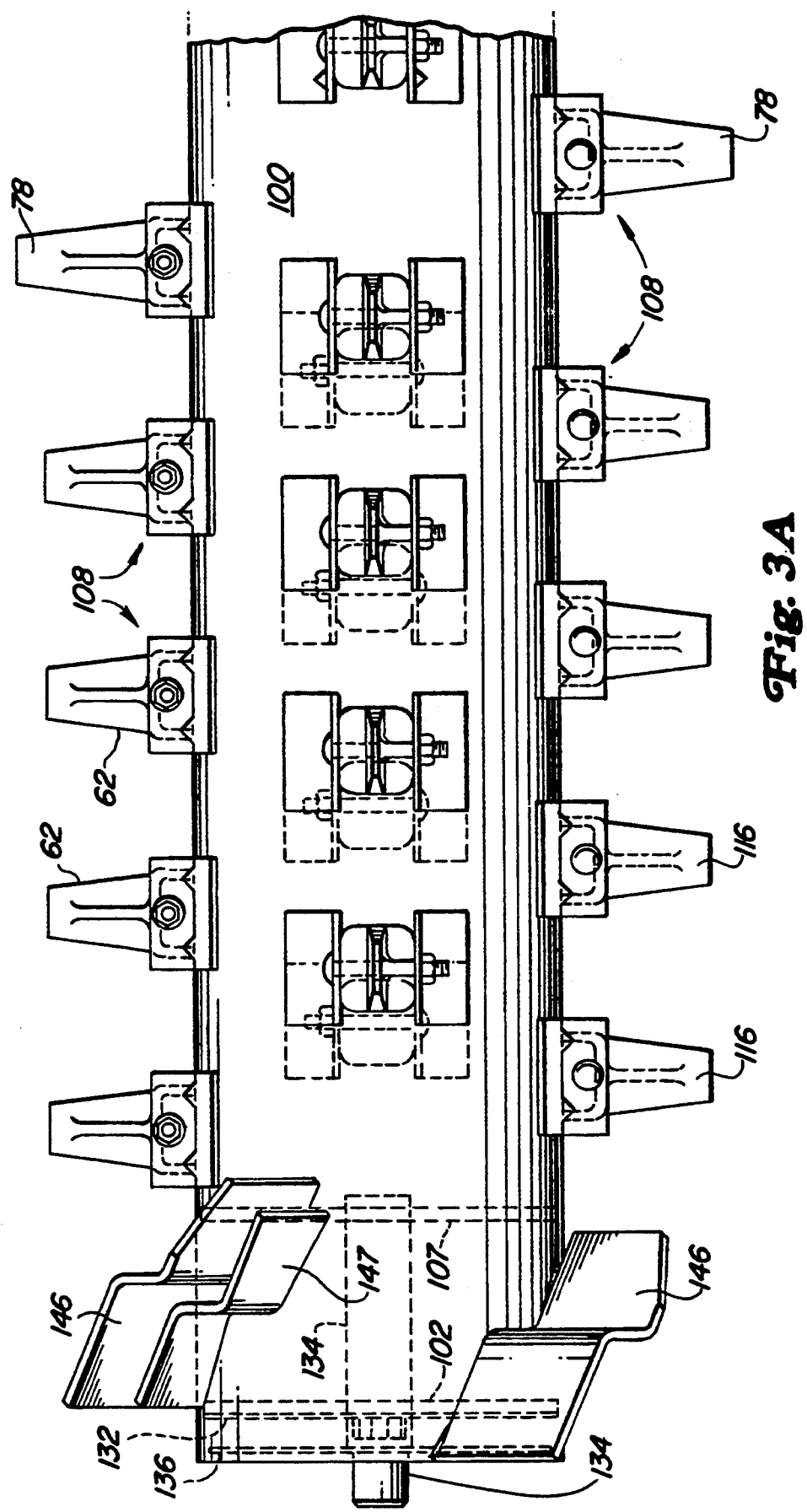
FIGS. 3a and 3b are side views of the rotor for the axial separator.
Figure 3B:
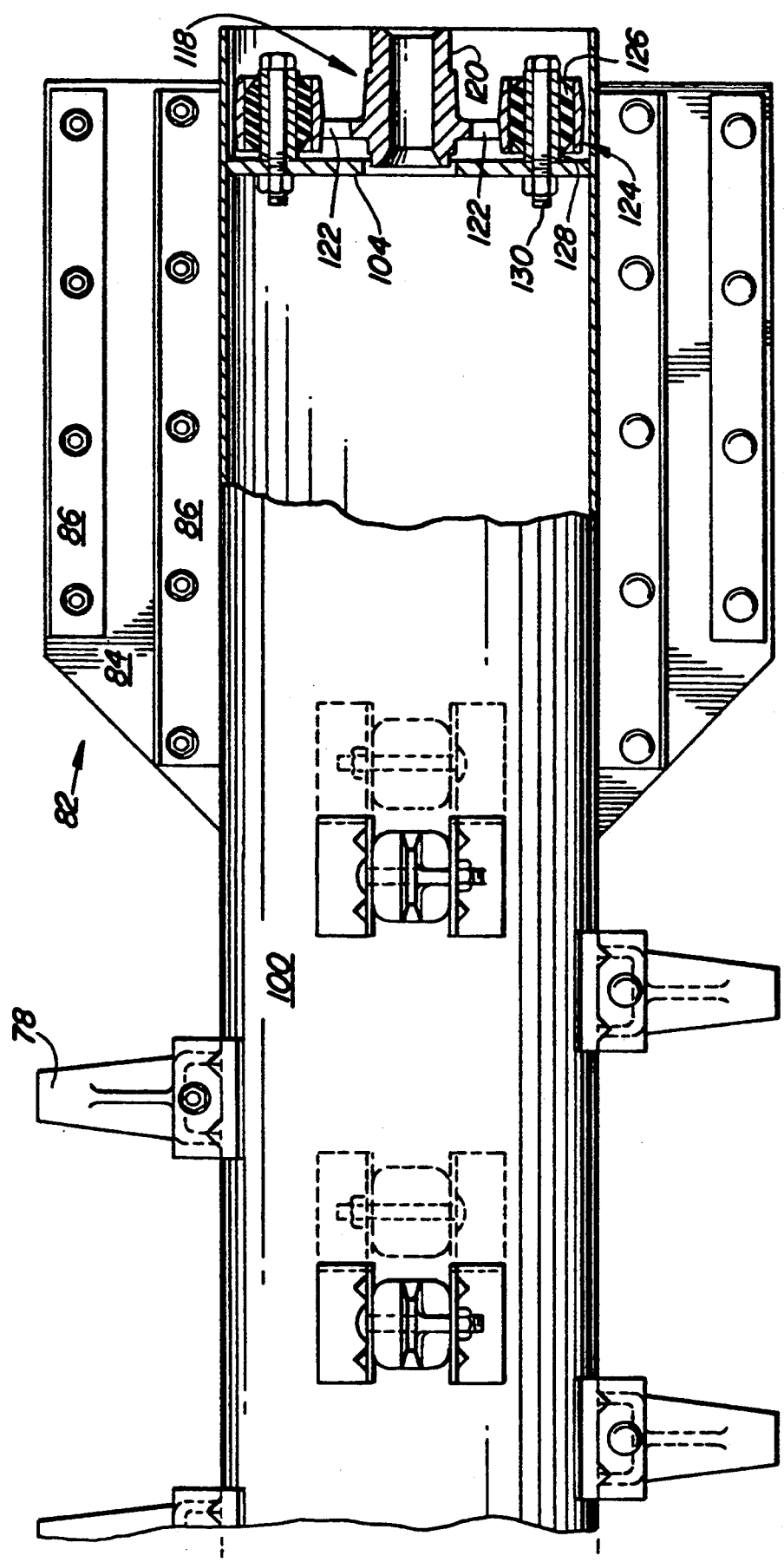
Figure 4:
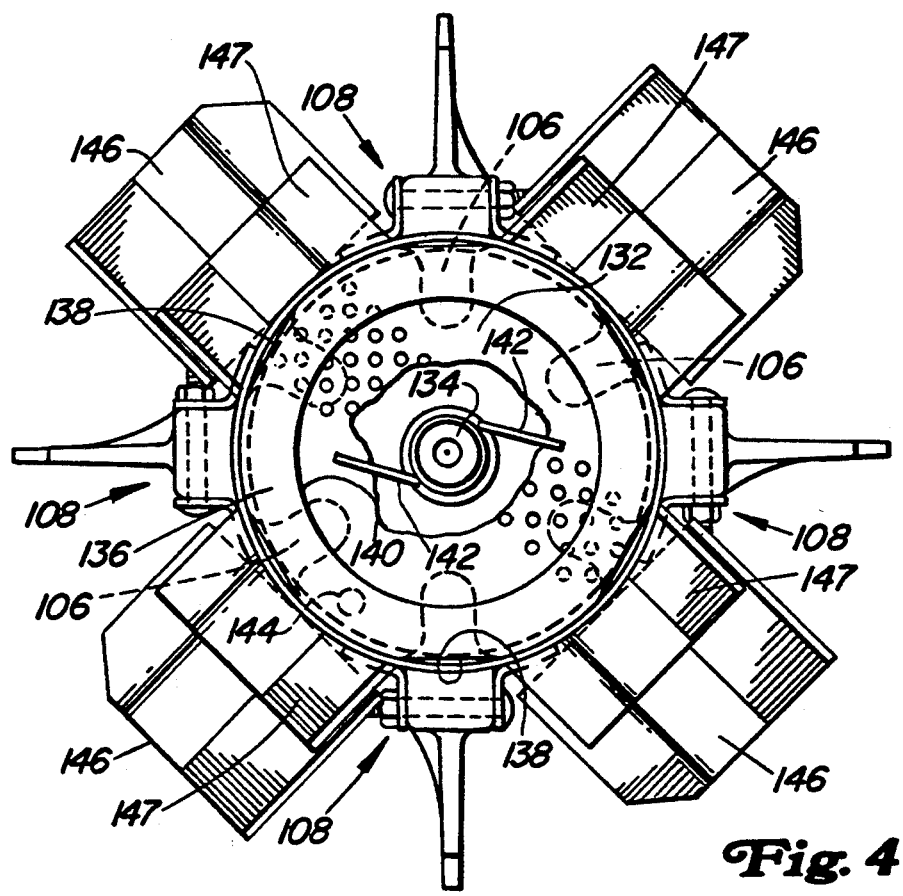
FIG. 4 is a front view of the rotor.
Figure 5:
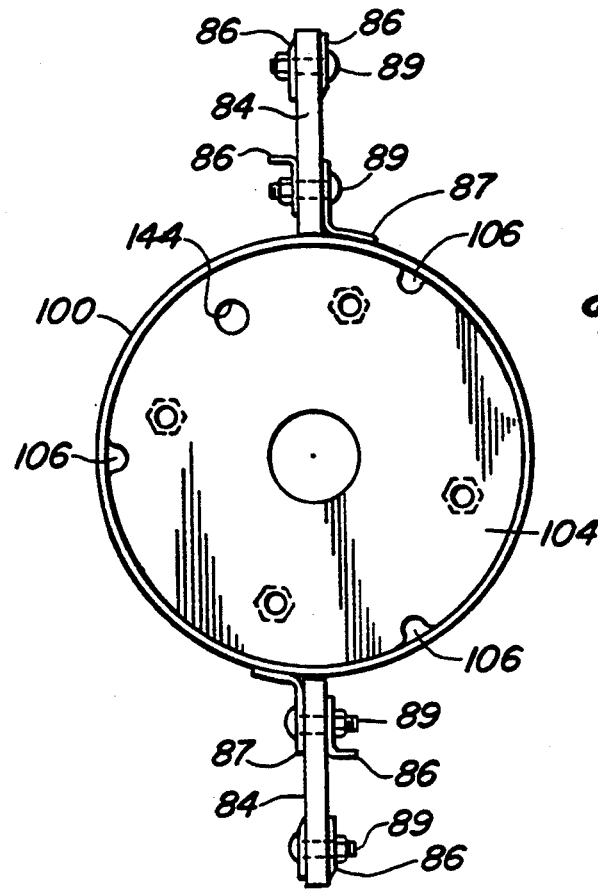
FIG. 5 is a rear view of the rotor.

The overall configuration of the axial separator 24 is best illustrated in FIGS. 2a and 2b. In the illustrated configuration the threshing cylinder 20 and associated concave 21 are spiked toothed for handling rice. It is found that the subject machine is particularly well suited to rice harvesting. However, the threshing means can be changed to handle different crops. A stripper roller 23 and an overshot beater 22 in conjunction with infeed housing 52 direct the threshed crop from the threshing cylinder and concave to the axial separator 24. The infeed housing 52 is best disclosed in U.S. Pat. No. 4,611,605 which is incorporated herein by reference.

The infeed zone for both axial separator units extends from front cross plate 54 to the second cross plate 56. The infeed zone is provided with a closed bottom 58. Extending upwardly from the closed bottom 58 are spiral vanes 60, shown in phantom lines, which drive the crop rearwardly into the separating means. The rotor in the infeed zone is provided with rigid fixed infeed teeth 62 which are shorter than the separating teeth found in the separating zone of the axial separator. These teeth are shorter to provide clearance for the upward extending vanes 60. In addition there are twice as many infeed teeth per linear length of rotor than are found in the separating zone of the rotor. The infeed zone cover 64 is provided with downwardly extending vanes 66 for driving the material in the infeed zone rearwardly. A crop divider plate 67 is positioned in the infeed zone between the rotors and comprises a vertically arranged cylindrical leading edge 68 having a rearwardly extending plate 69.

A separating zone extends from the second cross plate 56 to fourth cross plate 70. The bottom of each axial separator unit in the separator zone is provided with a separator grate formed from finger grates 72 and closed plates 73. Each of the finger grates are shaped like a comb whereas the closed plates are metal plates closing off a portion of the grate structure. The structure of the finger grates is best disclosed in U.S. Pat. No. 4,875,891, which is incorporated herein by reference. Grain and chaff dislodged from the crop material in the separating zone falls through the finger grates 72 onto shaker pan 32. The top cover plates 74 for the separator zone are provided with inwardly extending spiral vanes 76 for driving the crop rearwardly. As the bottom of the separator zone is not provided with spiral vanes, the rigid fixed separator teeth 78 are longer than the infeed teeth.

A discharge zone extends from the fourth cross plate 70 to the rear cross plate 80. The bottom of each of the axial separator units in the discharge zone is open so that straw can be deposited on the ground or directed to straw choppers or straw spreaders. The cover plate for the discharge zone is an extension of the separator cover plate 74 and is provided with spiral vanes 76. The rotor in the discharge zone is provided with two longitudinal paddles 82. Each paddle is made of a rubber sheet 84 having metal wear strips 86 and an inner mounting strip 87. The wear strips and the mounting strip are bolted to the rubber sheet by bolts 89. The mounting strips are welded to the rotor tube 100.

The axial separator is provided with a means for readily removing 88 the axial separator from the combine, which is best disclosed in U.S. Pat. No. 4,969,853, which is incorporated herein by reference. Each of the rotors is driven by a gearbox located at the rear of the axial separator. Drive sheave 90 drives a cross shaft which powers the two gear boxes. The drive system for the rotors is best disclosed in U.S. Pat. No. 4,739,773, which is incorporated herein by reference.

Axial Separator Rotor

Figure 11:
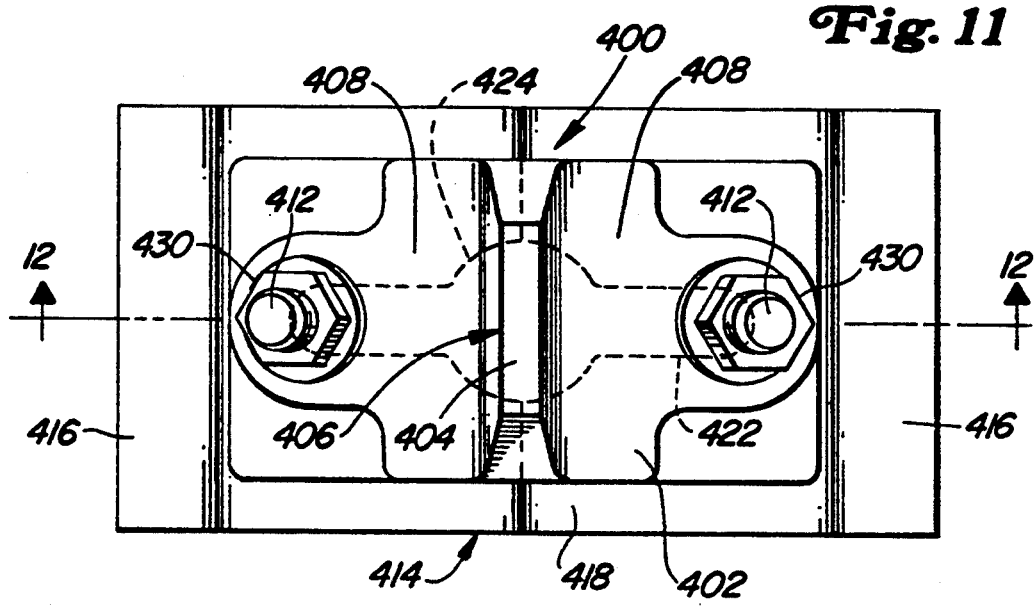
FIG. 11 is a top view of one of the preferred teeth and teeth mounting assembly.
Figure 12:
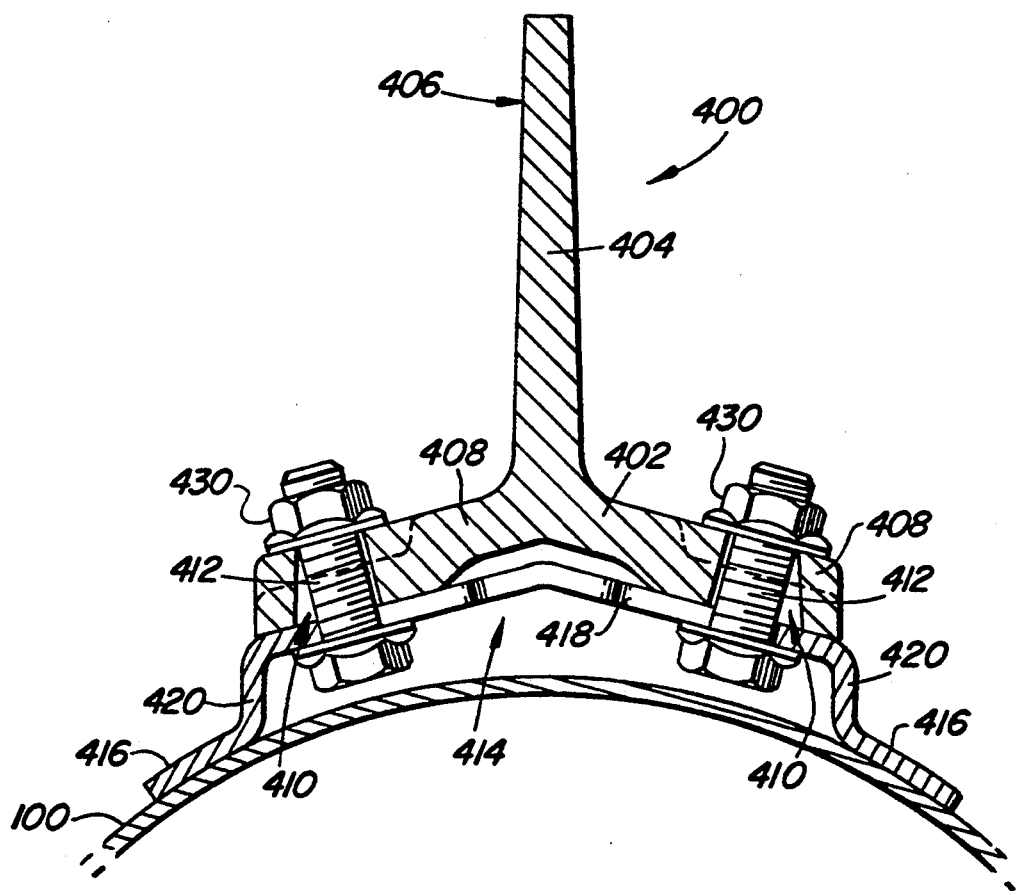
FIG. 12 is a side view of one of the preferred teeth and teeth mounting assembly.

The rotor is best illustrated in FIGS. 3a, 3b, 4 and 5. The rotor comprises a hollow cylindrical tube 100 having front end plate 102 and rear end plate 104 welded to the inside of the tube. Both end plates are provided with open notches 106 to allow paint to drain from the rotor after it has been dipped in a paint bath. Tooth mounting assemblies 108 are secured along the length of the of the tube in a spiral pattern. The preferred embodiment of the tooth mounting assemblies and the preferred embodiment of the teeth themselves, are best illustrated in FIGS. 11 and 12 and will be described in better detail with regard to these figures.

The rear end plate 104 is provided with a spline mounting assembly 118. The spline mounting assembly is provided with an internally splined fitting 120 for receiving the output shaft from a gear box located to the rear of the axial separator. Fitting 120 is provided with radial arms 122 extending outwardly from the fitting to bushings 124. Each bushing is provided with a elastomeric annular insert 126 which is wrapped around metal sleeve 128. The bushing is bolted to rear end plate 104 by bolts 130.

The front end plate 102 is provided with a screen 132 that is welded to the front end plate to prevent chaff and debris from entering the rotor tube through notches 106. A second identical front end plate 107 is located inside the rotor tube behind the front end plate 102. A stub shaft 134 is welded to both front end plates and projects axially outward from the rotor tube. The stub shaft is mounted in a bearing assembly located in front cross plate 54. An inwardly extending ring 136 is welded to the rotor tube. The ring 136 is provided with chordal openings 138 corresponding to notches 106 for allowing paint to drain from the rotor tube. The interior diameter of the inner edge 140 of ring 136 slightly larger than the outer diameter of a cylindrical tube (not shown) extending axially from front cross plate 54 into the interior of the rotor tube. The small circular gap defined by the cylindrical tube of cross plate 54 and the inner edge 140 of ring 136 further prevents the entry of chaff, dust and other debris into the rotor tube. To further reduce the accumulation of chaff, dust and debris in front of the baffle, two flat pieces of metal 142 are welded to the stub shaft next to the baffle. These metal pieces act as a fan to push air outwardly through the gap defined by the ring 136 and the cylindrical tube.

Balance holes 144 are formed in both front end plates 102 and 107 and the rear end plate 104. These holes are used for securing weights to the rotor. The weights are used for balancing the rotor.

Rigid metal paddles 146 are secured to the front of the rotor tube in the infeed zone. The paddles 146 are bolted to paddle mounting assemblies 147 that are welded to the rotor tube. The paddles are used for pulling the crop material into the infeed zone of the axial separator units. These paddles are as tall as the separator teeth 72, as such upwardly extending spiral vanes 60 do not extend under the paddles.

Axial Separator Housing

The frame for the axial separator housing is formed by right and left axial box beams 150, central axial tube 152, transverse cross plates 54, 56, 70, 80 and 154, interior sidewalls 178 forming diamond shaped area 180, and fixed cover 182. This frame is welded together and forms the main supporting assembly for the axial separator.

As discussed above the infeed zone located between transverse cross plates 54 and 56 is provided with a closed bottom 58. This bottom is formed from sheet metal bolted to the cross plates 54 and 56, the axial beams 150 and the axial tube 152.

A separator grate is located in the separator zone and comprises pivotable grids onto which the finger grates 72 and closed plates 73 are detachably mounted. Separate grids are located between second cross plate 56 and third cross plate 154, and between third cross plate 154 and fourth cross plate 70. The transverse portions of the grid are formed by arcuate cross members 156. Angle members 158 extend between the cross members and are welded thereto.

Each axial separator unit is provided with two grids, a front grid extending between cross plates 56 and 154, and a rear grid extending between cross plates 154 and 70. The grids pivot about axial pivot tubes 157 which pass through the cross plates. A first specialized channel member 160 is welded to the arcuate cross members and is provided with a semicircular portion 162 that engages the pivot tubes. Channel member 160 is also provided with an engagement bolt 164, the head of which engages the pivot tube to provide a snug fit for the grid.

Figure 6:
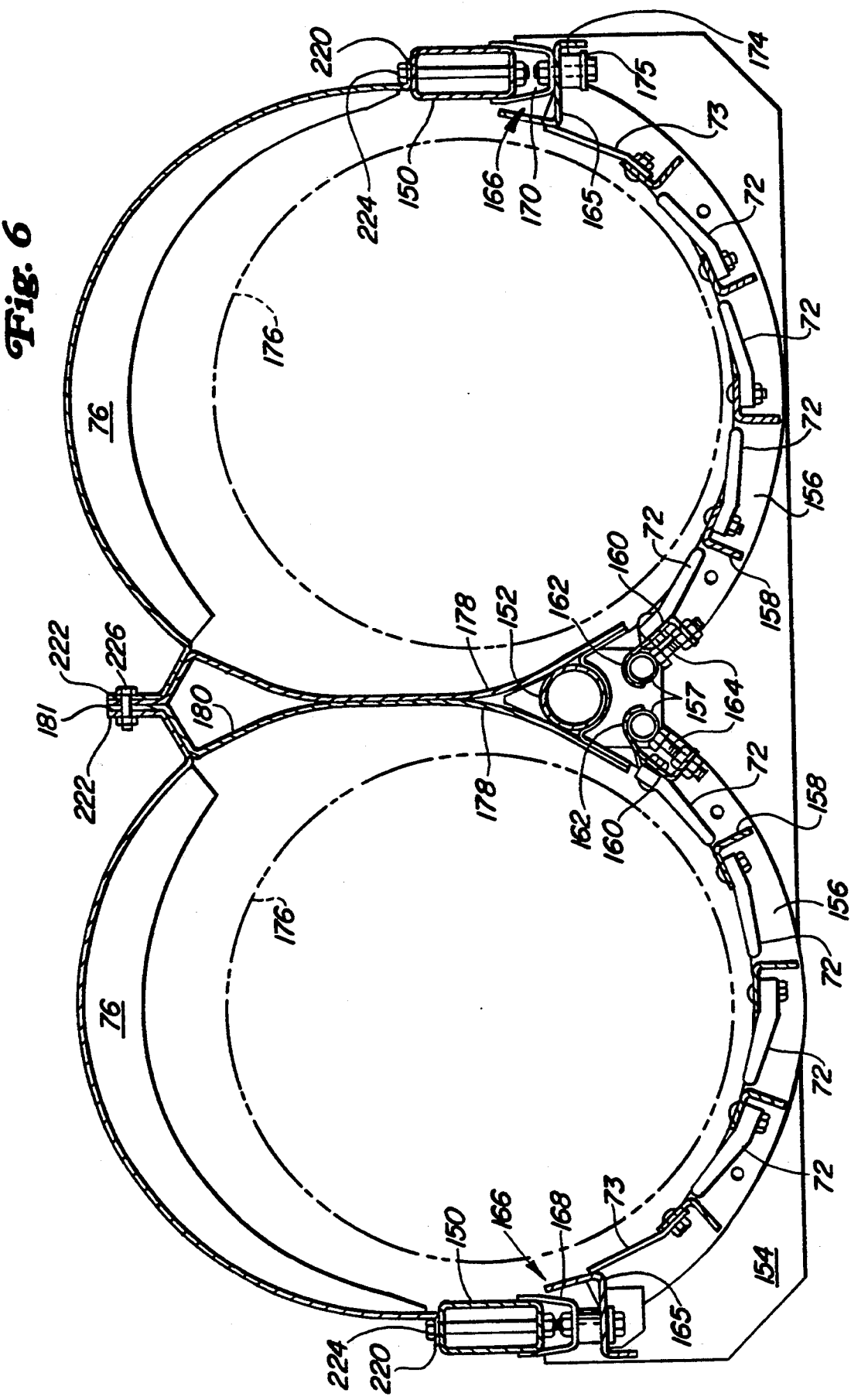
FIG. 6 is a front view of the rotor housing.

A second specialized channel member 165 is welded to the cross members and forms a portion of the grid adjustment assembly 166. The grid adjustment assembly comprises a bracket 168 that is welded to box beam 150. These brackets are relatively short and do not extend the axial length of the axial separator. As illustrated in FIG. 6, the right hand axial separator unit is provided with a mounting bolt 170 that passes through bracket 168, the second specialized channel member 164, a spacer 174, and a washer 176. By having the spacer 174 under the specialized channel member 164 the grid is closely spaced to the circle 176 defined by the rotating rotor. It has been found that a closely spaced relationship with the rotor is desirable in small grains such as rice. For corn a greater spacing between the rotor and the grid is desirable, so the spacer is located on top of the specialized channel member 164 as illustrated on the left hand axial separator unit. It should be noted, that although FIG. 6 shows the left hand axial separator unit adapted for corn and the right hand axial separator unit adapted for small grains, this was only done for illustration purposes.

The interior sides 178 of the axial separator units are formed from sheet metal welded to the axial tube. The sheet metal extends upwardly into a hollow diamond shaped area 180 and joined together to form a central axial rim 181 along the top of the axial separator. The rear of the axial separator is provided with a fixed cover 182 having two flat caps 184. The flat caps are designed to accommodate the bottom of the work platform 190.

Cover Assembly

Figure 7:
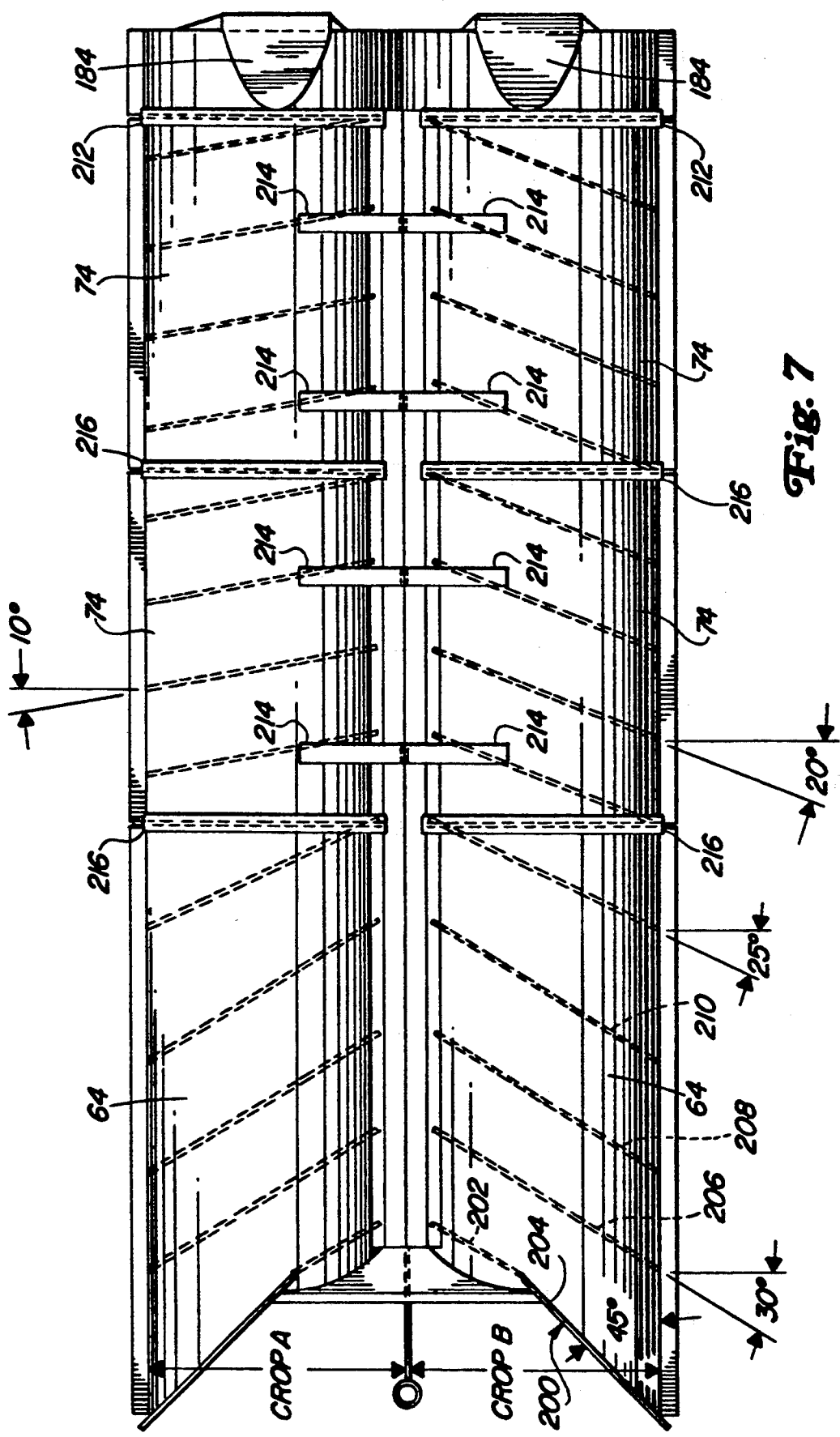
FIG. 7 is a top view of the rotor housing illustrating the positioning of the vanes.

From the inlet structure 52 to the rear fixed cover 182 the axial separator is provided with six cover members, three for each axial separator unit. These covers are best illustrated in FIG. 7, and are provided with a semi-circular sheet metal covering member to which the spiral vanes are welded. As with FIG. 6, for illustration purposes the covers for the top axial separator unit are adapted for corn, whereas the bottom axial separator unit is adapted for small grains, such as rice.

The front top covers 64 are the same for all crops. The inner side of the tops covers is provided with spiral vanes for directing the crop material rearwardly in the axial separator units. It has been found that the arrangement and orientation of these flow directing vanes is important in maintaining proper material flow in the separator units. The first vane 200 has a first portion 202 arranged at approximately thirty degrees from the transverse axis and a second portion 204 arranged at approximately forty-five degrees from the transverse axis. The next three vanes 206, 208 and 210 are arranged at approximately thirty degrees from the transverse axis.

A covering flange 212 is welded to the front of the fixed cover 182 to provide a covering for the adjoining edge of the adjacent cover 74 immediately forward of the fixed cover.

The next two covers 74 for each axial separator unit are identical depending on crop. The covers for the bottom axial separator unit are provided with vanes 76 that are arranged approximately twenty degrees from the transverse axis. It has been found that this twenty degree arrangement of vanes is best suited to small grains, such as rice. The vanes 76 for the covers of the top axial separator unit are arranged approximately ten degrees from the transverse axis. This ten degree arrangement for the vanes has been found to be best suited for corn.

All four covers 74 are provided with two handles 214 that are welded to the upper surface of the cover. In addition the front edge of each cover 74 is provided with a covering flange 216, similar to covering flange 212 for covering the edge formed between adjacent covers and the rear fixed cover 182.

The front covers 64 and the covers 74 are provided with outwardly extending mounting flanges 220 and upwardly extending mounting flanges 222. The outwardly extending mounting flanges 220 are bolted to box beam 150 by bolts 224 which extend through the box beam. The upwardly extending mounting flange 222 are bolted to the adjoining upwardly extending mounting flange through rim 181 by bolts 226.

The relationship of the flow directing vanes and rotor teeth in the infeed, separating and discharge zones is important for proper feeding of crop material through the axial separator units. The more steeply angled vanes (forty-five and thirty degrees) of the infeed top cover and the closed bottom accelerate the crop material rearwardly to bring it up to speed quickly. The more shallow angled vanes (twenty-five and twenty degrees for small grains, ten degrees for corn) of the covers prevent the crop material from increasing its rearward velocity. This ensures that the crop material will remain in the axial separator units long enough for proper separation.

A farmer in changing from a small grain crop to corn pulls the axial separator so that it extends out the rear of the combine as illustrated in U.S. Pat. No. 4,969,853 and unbolts the covers from the axial separator. He then installs the appropriate covers and reinserts the axial separator into the combine.

Separator Grate

As discussed above the separator grate is formed from finger grates 72 and closed plates 73 which are arranged on a pivotable grid. For small grains, it has been found that the arrangement of these plates is important to ensure proper separation without overloading the cleaning shoe. The pattern illustrated in FIG. 8 has been found to be the best arrangement for small grains and provides proper distribution of chaff on the shoe.

Each axial separator unit is provided with a separator grate six transverse rows 300, 302, 304, 306, 308 and 310 with five openings in each row. These openings are provided with closed plates 73 or finger grates 72. For the forwardmost row 300 only the outermost opening is provided with a closed plate 73. The four remaining openings are provided with finger grates 72 for allowing grain to pass through to shaker pan 32. The next row 302 has three finger grates 72 and two closed plates 73. The remaining rows 304, 306, 308 and 310 have two finger grates 72 and three closed plates 73.

Figure 8:
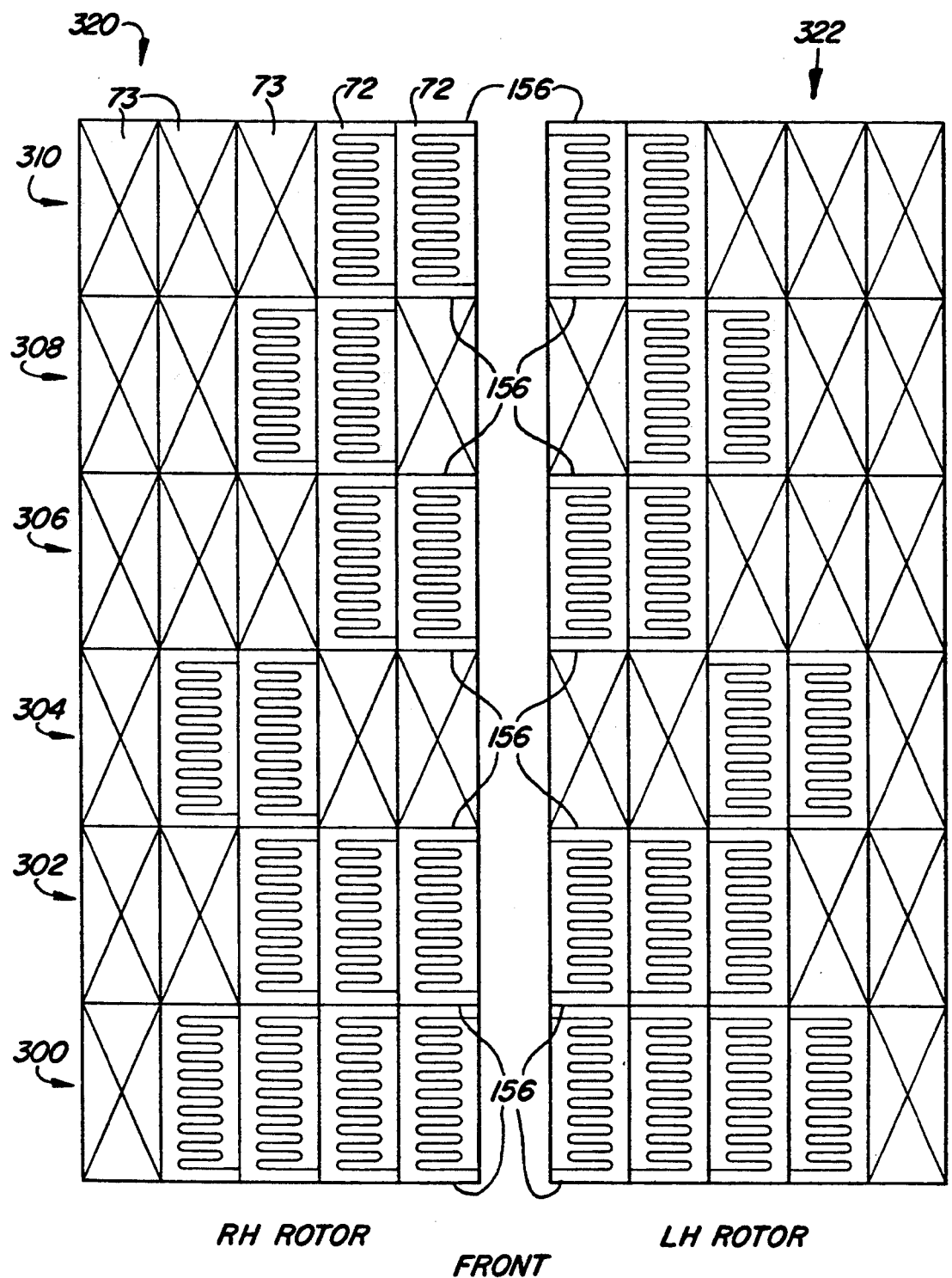
FIG. 8 is a schematic of the separator grate showing the location of the finger grates and blanked off places for small grains.

As illustrated in FIG. 8, the open area (finger grates) of the separator grate is greatest at the front (four finger grates) and uniformly decreases until the halfway point (two finger grates). After the halfway point the open area remains constant at two finger grates per row. Another way of looking at it is that the first-third (rows 300 and 302) of the separator grate has grates (finger grates) covering seventy percent of the separator grate and closed plates covering thirty percent of the separator grate. For the remaining two-thirds (rows 304, 306, 308 and 310) grates (finger grates) cover forty percent of the separator grate and closed plates cover sixty percent of the separator grates.

This arrangement has proved most efficient because the threshed material initially entering the axial separator units is grain rich. As the crop material moves through the axial separator unit it becomes less grain rich.

The diagram shown in FIG. 8 is for small grain. For corn all the closed plates, except for the outermost columns 320 and 322 of the plates, are removed and finger grates inserted in all the openings. It should also be noted that FIG. 8 does not agree with FIGS. 2a and 2b, in that the outermost openings for each row are closed in FIG. 8 and in FIGS. 2a and 2b the outermost openings are provided with finger grates. The finger grates in FIGS. 2a and 2b are included for illustration purposes.

Discharge Structure

It is important that the straw be evenly distributed as is comes out of the axial separator. An even distribution of straw allows straw choppers and straw spreader run more efficiently and more evenly distribute the straw on the ground.

Figure 10:
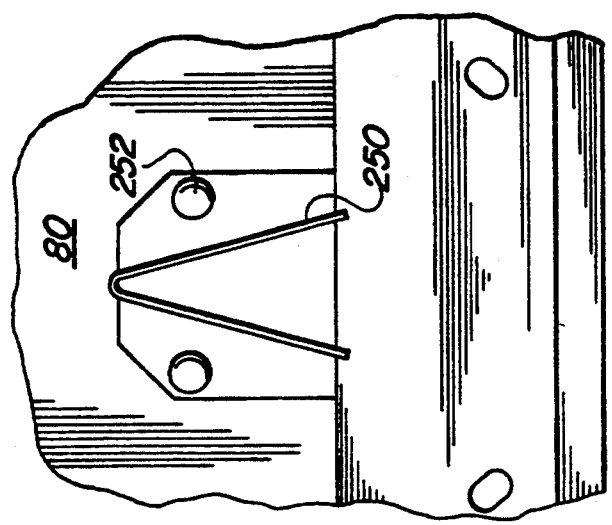
FIG. 10 is the inside end view of the discharge deflector.
Figure 9:
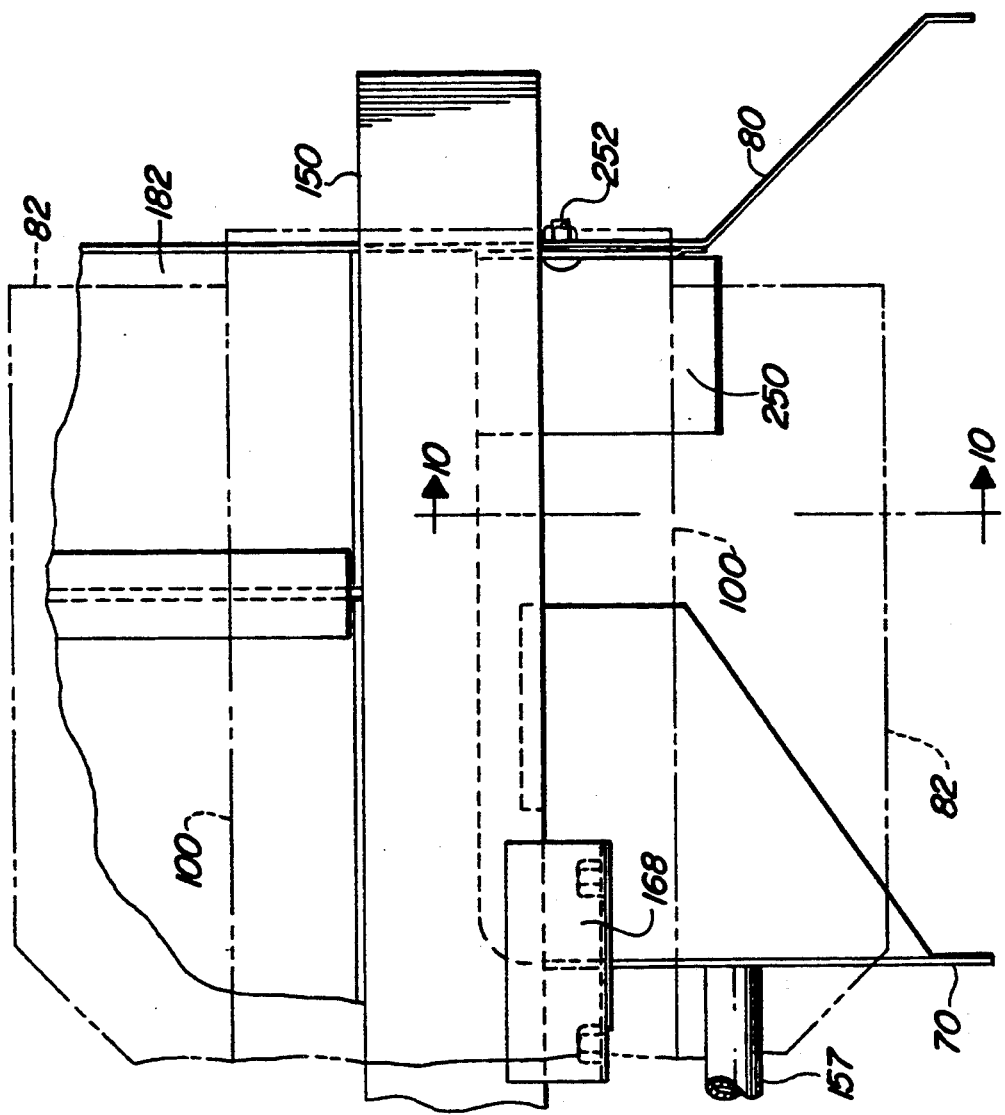
FIG. 9 is a partial side view of the rear of the axial separator showing the discharge structure.

The discharge structure of the axial separator is best illustrated in FIGS. 9 and 10. The discharge zone extends from crossplate 70 to rear crossplate 80. The discharge zone has an open bottom through which straw is ejected by paddles 82. The first seventy five percent of the axial length of the discharge area is open and unrestricted. The straw falling though this area concentrates below the axial centerline of the axial separator. The rear twenty-five percent of the discharge area is provided with a deflector 250 for deflecting the material to the outside edges of the axial separator to more evenly distribute the straw in the combine. The deflector is bolted to rear cross plate 80 by bolts 252 and extends axially forward therefrom for an axial distance of approximately one quarter the length of the discharge area.

Tooth Mounting Assembly

The axial separator tooth and mounting assembly illustrated in FIGS. 11 and 12 is the preferred form for both of these structures. The illustrated tooth and mounting assembly would be preferred for both the infeed teeth 62 and the separator teeth 72.

The tooth 400 is provided with a mounting base 402 and a tang portion 404 extending outward from the mounting base. The tang portion extends radially outward from the rotor tube 100 and have an axially arranged flat planar engagement surface 406. The mounting base is provided with two wings 408. Each of the wings is provided with a mounting aperture 410 through which tooth mounting bolts 412 are inserted.

Each tooth is mounted to a bracket 414 which is welded to rotor tube 100 at extended portions 416. The middle portion 418 of the bracket extends upward from the outer surface of the rotor tube by bracket legs 420. A bolt locating slot 422 is provided in the middle portion of the bracket. The center of the bolt locating slot is provided with an enlarged opening 424 through which the head of mounting bolt 412 can be inserted. After the head of the first mounting bolt is inserted through the enlarged opening 424, the bolt is slid to one end of the slot. The head of the second mounting bolt is inserted through the enlarged opening 424 and the process repeated. Both mounting bolts are then aligned with mounting apertures 410 of the tooth 400 and the mounting bolts secured to nuts 430 mounting the tooth to the bracket. The bolts are of sufficient length and the slot is designed so that the bolts are captured in the bracket and extend radially outwardly therefrom when they are slid along the slot outwardly from the enlarged opening.

In initially assembling the rotor the tooth is bolted to the bracket and the bracket welded to the tube. Such a system in initially mounting the brackets eliminates stresses that may be caused when bolting the teeth to brackets.

Operation

The speed of the transverse threshing cylinder and concave, and the clearance between the threshing cylinder and concave are adjusted in conventional manner. These adjustments maximize the threshing efficiency of the cylinder and concave for different crops. As the axial separator is more efficient than straw walkers in removing additional grain from the threshed crop material, a more gentle threshing action maybe selected for the threshing cylinder. Similarly the clearances for the chaffer and sieve of the cleaning shoe are also optimized for individual crops.

As illustrated in FIG. 6 the rotor of each axial separator unit is located in a non-concentric housing. As seen in cross section, the housing is provided with a semi-circular top and a semi-circular bottom that are joined together by substantially straight vertical sides. The rotor is located towards the bottom of the housing and is provided with teeth that engage only a relatively small portion of the crop material in the axial separator.

The teeth penetrate the crop material and pull the crop material around rather than pushing the material as is typical of conventional axial combines. This pulling prevents the material from rolling and forming ropes of material or slugs which may jam the separator. Due to the shape of the axial separator housing, the crop material is initially engaged by the teeth rotated and released as it is thrown upwardly against the crop directing vanes which drive the crop rearwardly.

The releasing of the crop material is due to the centrifugal force lifting the crop material off the teeth into the space located above the rotor that is formed by the non-concentric housing and the off center location of the rotor. This centrifugal force is provided by a rotor rotating in a specific speed range. In addition it is important not to cause excessive straw breakage by higher speeds.

It has been found that a rotor having a diameter of 500 mm as defined by the tips of the separator and infeed teeth needs a minimum speed of 450 rpm and a maximum speed of 800 rpm. This results in a minimum tip speed of 11.8 m/sec and a maximum tip speed of 20.9 m/sec. At a tip speed slower than 11.8 m/sec the crop does not release from the teeth properly. At a tip speed faster than 20.9 m/sec straw breakage is increased.

As the minimum tip speed, is a minimum release speed and the infeed teeth are shorter than the separator teeth, the minimum speed applies to the infeed teeth. The maximum speed prevents undue grain damage and is the maximum speed allowable for the separator teeth, as they are longer than the infeed teeth.

The invention should not be limited to the above-described embodiment, but should be limited solely to the claims that follow.

We claim:

1. An agricultural combine for harvesting and threshing a crop in a field, the combine comprising:
   a supporting structure;
   a transverse threshing cylinder and concave mounted to the supporting structure for threshing a harvested crop;
   an axial separator is mounted to the supporting structure for receiving a threshed crop from the transverse threshing cylinder and concave for further separating the grain and chaff from the straw of the crop, the axial separator is provided with a rotor and a casing housing the rotor, the rotor is provided with fixed separator teeth and fixed infeed teeth that extend radially outward from the rotor, said infeed teeth being shorter than said separator teeth, the rotor is rotated in the casing so that the tip speed of the infeed teeth is greater than or equal to 11.8 m/sec and the tip speed of the separator teeth is less than or equal to 20.9 m/sec.

2. An agricultural combine as defined by claim 1 wherein the casing for the rotor is a non-concentrical housing having a high clearance area into which the teeth do not extend and a teeth engagement area in which the teeth engage the crop material.

3. An agricultural combine as defined by claim 2 wherein the rotor is located in the teeth engagement area of the housing so that the teeth of the rotor engage and penetrate the crop material in the teeth engagement area of the housing and throw it into the high clearance area of the housing releasing it from the rotor as it is being rotated.

4. An agricultural combine as defined by claim 3 wherein the high clearance area is provided with downwardly projecting spiral vanes which direct the crop rearwardly.

* * * * *